United States Patent
Soh

(10) Patent No.: US 11,474,564 B2
(45) Date of Patent: Oct. 18, 2022

(54) FOLDABLE DISPLAY DEVICE AND METHOD OF MANUFACTURING FOLDABLE DISPLAY DEVICE

(71) Applicant: Samsung Display Co., Ltd., Yongin-si (KR)

(72) Inventor: Yong Kwon Soh, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 127 days.

(21) Appl. No.: 17/004,326

(22) Filed: Aug. 27, 2020

(65) Prior Publication Data
US 2021/0096600 A1 Apr. 1, 2021

(30) Foreign Application Priority Data

Sep. 30, 2019 (KR) .................. 10-2019-0120924

(51) Int. Cl.
*G06F 1/16* (2006.01)

(52) U.S. Cl.
CPC .......... *G06F 1/1652* (2013.01); *G06F 1/1616* (2013.01); *G06F 1/1656* (2013.01); *G06F 1/1681* (2013.01)

(58) Field of Classification Search
CPC .... G06F 1/1652; G06F 1/1616; G06F 1/1656; G06F 1/1681
See application file for complete search history.

(56) References Cited

U.S. PATENT DOCUMENTS

| | | | | |
|---|---|---|---|---|
| 9,541,962 | B2* | 1/2017 | Siddiqui | G06F 1/1679 |
| 10,761,572 | B1* | 9/2020 | Siddiqui | G06F 1/1681 |
| 2018/0292860 | A1* | 10/2018 | Siddiqui | G06F 1/1681 |
| 2019/0278338 | A1* | 9/2019 | Siddiqui | F16C 11/04 |

(Continued)

FOREIGN PATENT DOCUMENTS

| | | |
|---|---|---|
| EP | 3599531 | 1/2020 |
| KR | 10-0385669 | 5/2003 |
| KR | 10-0389167 | 6/2003 |

(Continued)

OTHER PUBLICATIONS

Extended European Search Report dated Feb. 15, 2021, in European Patent Application No. 20198584.3.

*Primary Examiner* — Anthony Q Edwards
(74) *Attorney, Agent, or Firm* — H.C. Park & Associates, PLC

(57) ABSTRACT

A foldable display device includes a flexible display module, a case, first and second support plates, and a first protective film. The flexible display module includes a display surface and a back surface opposing the display surface. The case is on the back surface and includes: a hinge portion, and first and second covers rotatably coupled to the hinge portion in first and second directions, respectively. The second direction is opposite the first direction. The first support plate is between the flexible display module and the first cover, and supports a first side portion of the flexible display module. The second support plate is between the flexible display module and the second cover, and supports a second side portion of the flexible display module. The first protective film is coupled between the first and second support plates, and covers the back surface exposed between the first and second support plates.

21 Claims, 12 Drawing Sheets

(56) References Cited

U.S. PATENT DOCUMENTS

2019/0280244 A1 9/2019 Kwon et al.
2021/0034109 A1* 2/2021 Torres .................. G06F 1/1641

FOREIGN PATENT DOCUMENTS

| KR | 10-0415695 | 1/2004 |
| KR | 10-2017-0122554 | 11/2017 |
| KR | 10-2019-0050325 | 5/2019 |
| KR | 10-2019-0065640 | 6/2019 |
| WO | 2016/061017 | 4/2016 |

* cited by examiner

FOLDABLE DISPLAY DEVICE AND METHOD OF MANUFACTURING FOLDABLE DISPLAY DEVICE

CROSS-REFERENCE TO RELATED APPLICATION

This application claims priority to and the benefit of Korean Patent Application No. 10-2019-0120924, filed Sep. 30, 2019, which is hereby incorporated by reference for all purposes as if fully set forth herein.

BACKGROUND

Field

Exemplary embodiments generally relate to a display device, and more particularly, to a foldable display device and a method of manufacturing the foldable display device.

Discussion

A display device may provide information to a user by displaying an image. In some instances, users may utilize a flexible display device that is deformable in various forms or manners. Unlike a flat panel display, a flexible display device may be folded, bent, or rolled like a paper, or otherwise manipulated, e.g., twisted, etc. The flexible display device can be portable and can improve convenience of the user.

The above information disclosed in this section is only for understanding the background of the inventive concepts, and, therefore, may contain information that does not form prior art.

SUMMARY

Some aspects are capable of providing a foldable display device having an improved reliability and a method of manufacturing the same.

Additional aspects will be set forth in the detailed description which follows, and, in part, will be apparent from the disclosure, or may be learned by practice of the inventive concepts.

According to some aspects, a foldable display device includes a foldable display module, a case, a first support plate, a second support plate, and a first protective film. The flexible display module includes a display surface and a back surface opposite to the display surface. The case is disposed on the back surface of the flexible display module. The case includes: a hinge portion, a first cover rotatably coupled to the hinge portion in a first direction, and a second cover rotatably coupled to the hinge portion in a second direction opposite to the first direction. The first support plate is disposed between the flexible display module and the first cover. The first support plate supports a first side portion of the flexible display module. The second support plate is disposed between the flexible display module and the second cover. The second support plate supports a second side portion of the flexible display module and is spaced apart from the first support plate. The first protective film is coupled between the first support plate and the second support plate. The first protective film covers the back surface of the flexible display module exposed between the first support plate and the second support plate.

According to some aspects, a foldable display device includes a foldable display module, a case, a first support plate, a second support plate, and a first protective film. The foldable display module includes: a folding portion, a first non-folding portion positioned in a first direction from the folding portion, and a second non-folding portion positioned in a second direction from the folding portion. The second direction is opposite to the first direction. The case is disposed on the flexible display module. The case includes: a hinge portion, a first cover rotatably coupled to the hinge portion in the first direction, and a second cover rotatably coupled to the hinge portion in the second direction. The first support plate is disposed between the flexible display module and the first cover. The first supporting plate supports the first non-folding portion of the flexible display module. The second support plate is disposed between the flexible display module and the second cover. The second support plate supports the second non-folding portion of the flexible display module and is spaced apart from the first support plate. The first protective film is coupled between the first support plate and the second support plate. The first protective film covers the folding portion of the flexible display module exposed between the first support plate and the second support plate. The first protective film is positioned inside the hinge portion.

According to some aspects, a method of manufacturing a foldable display device includes: attaching a first support plate to a first non-folding portion of a flexible display module, the first non-folding portion being positioned in a first direction from a folding portion of the flexible display module; attaching a second support plate to a second non-folding portion of the flexible display module, the second non-folding portion being positioned in a second direction from the folding portion of the flexible display module, the second direction being opposite to the first direction; attaching a protective member to the first support plate and the second support plate such that a first protective film of the protective member covers the folding portion of the flexible display module exposed between the first support plate and the second support plate, the first protective film being symmetrically folded along a third direction orthogonal to the first direction; and attaching a case to the first support plate and the second support plate, the case including: a hinge portion, a first cover rotatably coupled to the hinge portion in the first direction, and a second cover rotatably coupled to the hinge portion in the second direction.

According to various exemplary embodiments, a foldable display device may include a first protective film coupled to a first support plate and a second support plate to cover a back surface of a folding portion of a flexible display module exposed between the first support plate and the second support plate, and positioned inside a hinge portion, so that foreign substances may not flow into the flexible display module through between the first support plate and the second support plate. As such, the reliability of the foldable display device may be improved.

The foregoing general description and the following detailed description are exemplary and explanatory and are intended to provide further explanation of the claimed subject matter.

BRIEF DESCRIPTION OF THE DRAWINGS

Illustrative, non-limiting embodiments will be more clearly understood from the following detailed description taken in conjunction with the accompanying drawings.

DETAILED DESCRIPTION OF SOME EXEMPLARY EMBODIMENTS

Figure 1:
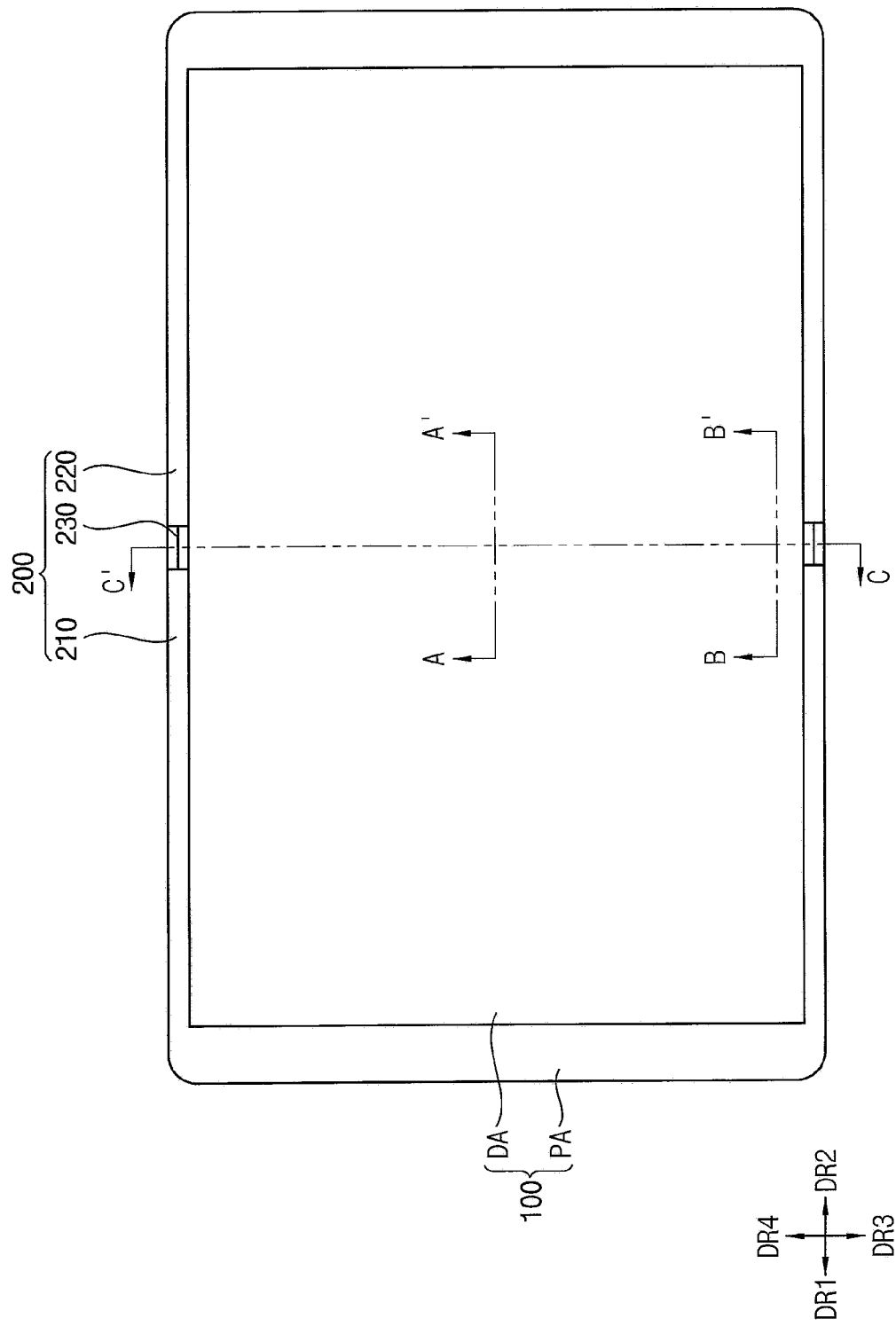
FIG. 1 is a plan view illustrating an unfolded state of a foldable display device according to some exemplary embodiments.

In the following description, for the purposes of explanation, numerous specific details are set forth in order to provide a thorough understanding of various exemplary embodiments. As used herein, the terms "embodiments" and "implementations" are used interchangeably and are non-limiting examples employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some exemplary embodiments. Therefore, unless otherwise specified, the features, components, modules, layers, films, panels, regions, aspects, etc. (hereinafter individually or collectively referred to as an "element" or "elements"), of the various illustrations may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. As such, the sizes and relative sizes of the respective elements are not necessarily limited to the sizes and relative sizes shown in the drawings. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element, it may be directly on, connected to, or coupled to the other element or intervening elements may be present. When, however, an element is referred to as being "directly on," "directly connected to," or "directly coupled to" another element, there are no intervening elements present. Other terms and/or phrases used to describe a relationship between elements should be interpreted in a like fashion, e.g., "between" versus "directly between," "adjacent" versus "directly adjacent," "on" versus "directly on," etc. Further, the term "connected" may refer to physical, electrical, and/or fluid connection. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one element's relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional views, isometric views, perspective views, plan views, and/or exploded illustrations that are schematic illustrations of idealized exemplary embodiments and/or intermediate structures. As such, variations from the shapes of the illustrations as a result of, for example, manufacturing techniques and/or tolerances, are to be expected. Thus, exemplary embodiments disclosed herein should not be construed as limited to the particular illustrated shapes of regions, but are to include deviations in shapes that result from, for instance, manufacturing. To this end, regions illustrated in the drawings may be schematic in nature and shapes of these regions may not reflect the actual shapes of regions of a device, and, as such, are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the inventive concepts. Further, the blocks, units, and/or modules of some exemplary embodiments may be physically combined into more complex blocks, units, and/or modules without departing from the inventive concepts.

Hereinafter, various exemplary embodiments will be explained in detail with reference to the accompanying drawings.

Figure 2:
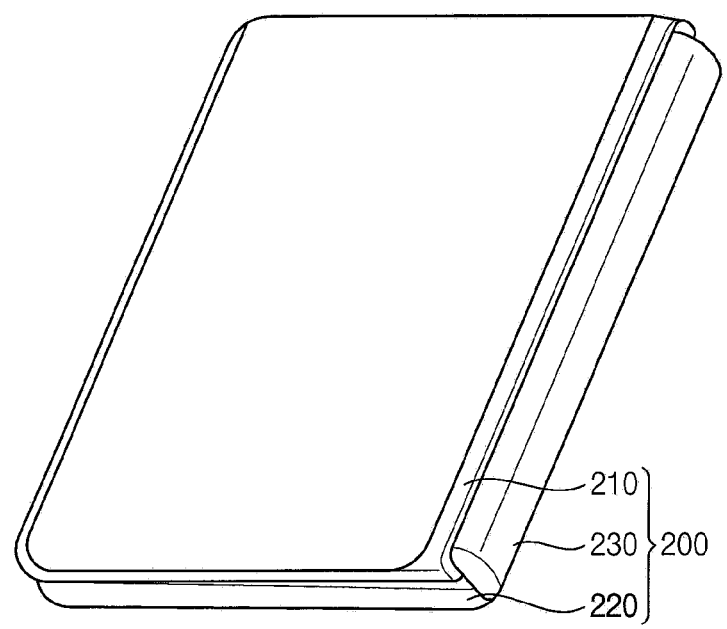
FIG. 2 is a perspective view illustrating a folded state of the foldable display device of FIG. 1 according to some exemplary embodiments.

FIG. 1 is a plan view illustrating an unfolded state of a foldable display device according to some exemplary embodiments. FIG. 2 is a perspective view illustrating a folded state of the foldable display device of FIG. 1 according to some exemplary embodiments.

Referring to FIGS. 1 and 2, the foldable display device according to some embodiments may include a flexible display module 100 and a case 200.

The flexible display module 100 may include a display area DA and a peripheral area PA. The display area DA displays an image, and the peripheral area PA may be outside (e.g., surround) the display area DA to form, for instance, a bezel of the foldable display device.

The flexible display module 100 may include a flexible substrate including flexible plastic or the like, instead of (or in addition to) a rigid substrate including rigid glass or the like. Accordingly, the flexible display module 100 may be folded or unfolded freely within a predetermined range. The flexible display module 100 may be supported to be folded or unfolded by the case 200.

The case 200 may include a first cover 210, a second cover 220, and a hinge portion 230. The first cover 210 may be rotatably coupled to the hinge portion 230 in a first direction DR1, and the second cover 220 may be rotatably coupled to the hinge portion 230 in a second direction DR2 opposite to the first direction DR1. The hinge portion 230 may be positioned between the first cover 210 and the second cover 220, and may extend along a third direction DR3 orthogonal to the first direction DR1 and the second direction DR2, as well as extend in a fourth direction DR4 opposite to the third direction DR3.

Figure 3:
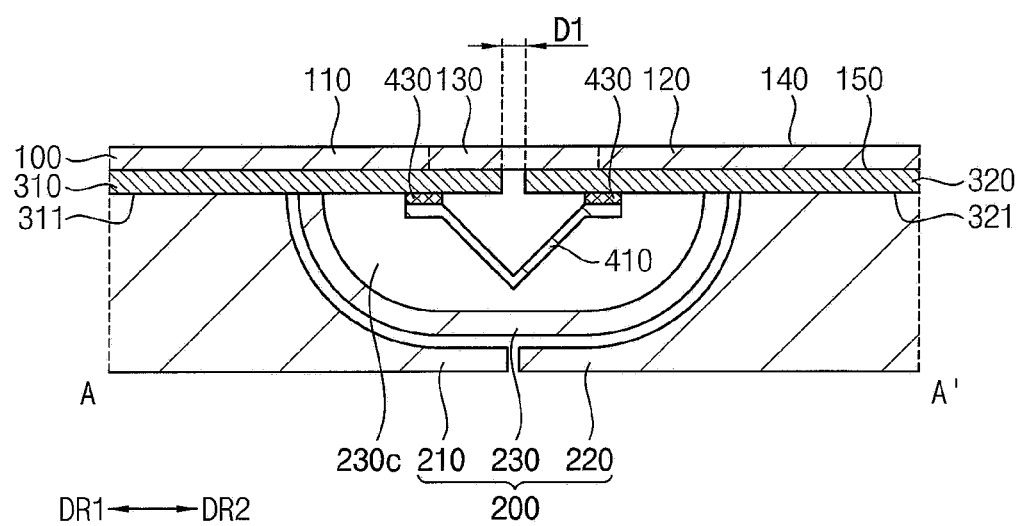
FIG. 3 is a sectional view illustrating an example of the foldable display device taken along sectional line A-A' of FIG. 1 according to some exemplary embodiments.
Figure 4:
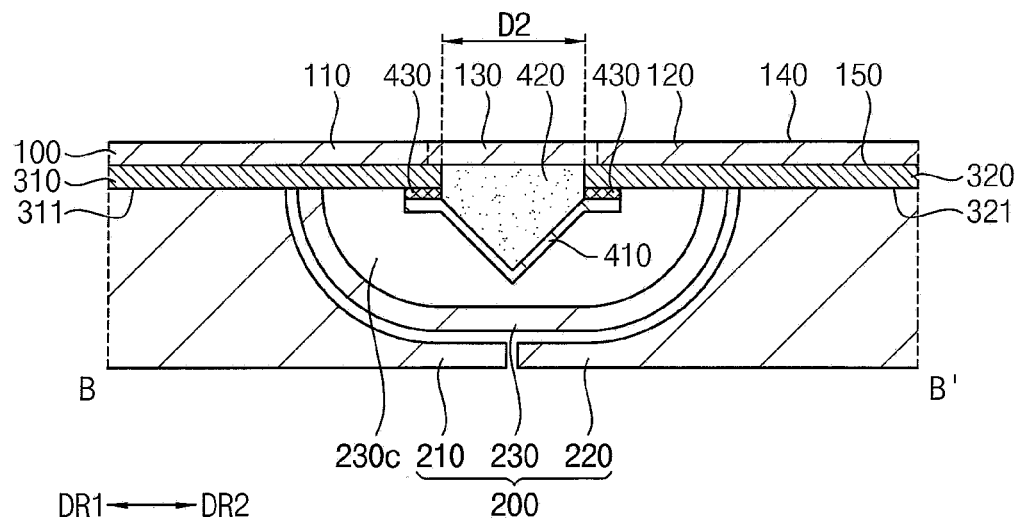
FIG. 4 is a sectional view illustrating the foldable display device taken along sectional line B-B' of FIG. 1 according to some exemplary embodiments.
Figure 5:
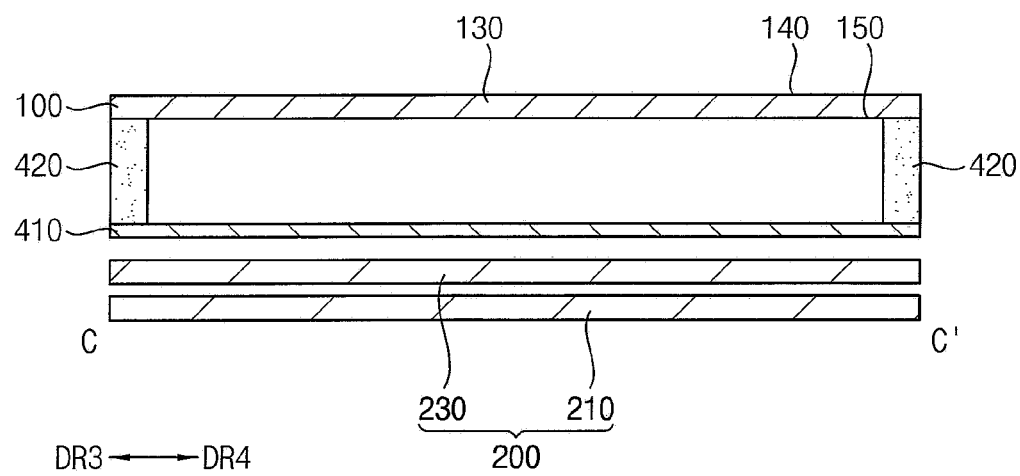
FIG. 5 is a sectional view illustrating the foldable display device taken along sectional line C-C' of FIG. 1 according to some exemplary embodiments.

FIG. 3 is a sectional view illustrating an example of the foldable display device taken along sectional line A-A' of FIG. 1 according to some exemplary embodiments. FIG. 4 is a sectional view illustrating the foldable display device taken along sectional line B-B' of FIG. 1 according to some exemplary embodiments. FIG. 5 is a sectional view illustrating the foldable display device taken along sectional line C-C' of FIG. 1 according to some exemplary embodiments. For instance, FIG. 3 illustrates a section of a central portion of the foldable display device in the third direction DR3 or the fourth direction DR4, FIG. 4 illustrates a section of a side portion of the foldable display device in the third direction DR3, and FIG. 5 illustrates a section of a central portion of the foldable display device in the first direction DR1 or the second direction DR2.

Referring to FIGS. 1 and 3-5, the foldable display device may include a flexible display module 100, a case 200, a first support plate 310, a second support plate 320, a first protective film 410, and a second protective film 420.

The flexible display module 100 may include a first non-folding portion 110, a second non-folding portion 120, and a folding portion 130. The folding portion 130 may be positioned between the first non-folding portion 110 and the second non-folding portion 120. The first non-folding portion 110 may be positioned in the first direction DR1 from the folding portion 130, and the second non-folding portion 120 may be positioned in the second direction DR2 from the folding portion 130. The first non-folding portion 110 and the second non-folding portion 120 may be portions that are not foldable portions of the flexible display module 100. The folding portion 130 may be a portion configured to be folded in the flexible display module 100.

The flexible display module 100 may include a display surface 140 and a back surface 150 opposite to the display surface 140. In this manner, the display surface 140 may be stacked onto the back surface in a thickness direction of the flexible display device. The flexible display module 100 may display an image in a direction of the display surface 140. The back surface 150 may be a non-display surface on which the image is not displayed. The case 200 including the first cover 210, the second cover 220, and the hinge portion 230 may be disposed on the back surface 150 of the flexible display module 100.

The first support plate 310 may be disposed between the flexible display module 100 and the first cover 210. The first support plate 310 may support a first side portion of the flexible display module 100.

In an embodiment, the first support plate 310 may support the first non-folding portion 110 of the flexible display module 100 and a first region of the folding portion 130 adjacent to the first non-folding portion 110. For example, an adhesive layer may be interposed between the first support plate 310 and the back surface 150 of the first non-folding portion 110. The first support plate 310 may support the first non-folding portion 110 in a fixed state of being attached to the first non-folding portion 110. In addition, the first support plate 310 may support the first region of the folding portion 130 adjacent to the first non-folding portion 110 in an unfixed state in which the first support plate 310 is not attached to the first region of the folding portion 130 adjacent to the first non-folding portion 110.

The second support plate 320 may be disposed between the flexible display module 100 and the second cover 220. The second support plate 320 may support a second side portion different from the first side portion of the flexible display module 100.

In an embodiment, the second support plate 320 may support the second non-folding portion 120 of the flexible display module 100 and a second region of the folding portion 130 adjacent to the second non-folding portion 120. For example, an adhesive layer may be interposed between the second support plate 320 and the back surface 150 of the second non-folding portion 120. The second support plate 320 may support the second non-folding portion 120 in a fixed state of being attached to the second non-folding portion 120. In addition, the second support plate 320 may support the second region of the folding portion 130 adjacent to the second non-folding portion 120 in an unfixed state in which the second support plate 320 is not attached to the second region of the folding portion 130 adjacent to the second non-folding portion 120.

The first support plate 310 and the second support plate 320 may be spaced apart from each other at a predetermined interval. In an embodiment, an interval D2 between a side of the first support plate 310 near a lower portion of the case 200 and a side of the second support plate 320 near the lower portion of the case 200, and an interval between the side portion of the first support plate 310 near an upper portion of the case 200 and the side portion of the second support plate 320 near the upper portion of case 200 may be larger than an interval D1 between a central portion of the first support plate 310 near a central portion of the case 200 and a central portion of the second support plate 320 near the central portion of the case 200.

Each of the first support plate 310 and the second support plate 320 may include at least one of metal, plastic, and the like. For example, the metal may include at least one of invar, nobinite, stainless steel, and an alloy thereof.

The first protective film 410 may be coupled between the first support plate 310 and the second support plate 320 so that the back surface 150 of the folding portion 130 of the flexible display module 100 exposed between the first support plate 310 and the second support plate 320 may be covered. The first protective film 410 may be positioned inside the hinge portion 230, such as in a cavity region 230c of the hinge portion 230. In other words, at least a part of the first protective film 410 may be at least partially surrounded by the hinge portion 230.

The first protective film 410 may be flexible. In an embodiment, the first protective film 410 may be a flexible thin film tape. Since the first protective film 410 is flexible, a shape of the first protective film 410 may be changed according to the rotation of the first support plate 310 and the second support plate 320 that are coupled to the first protective film 410.

An adhesive film 430 may be disposed between the first support plate 310 and the first protective film 410 and between the second support plate 320 and the first protective film 410. In an embodiment, the adhesive film 430 may be disposed between the back surface 311 of the first support plate 310 and the first protective film 410 and between the back surface 321 of the second support plate 320 and the first protective film 410. The adhesive film 430 may bond the first protective film 410 to the back surface 311 of the first support plate 310 and the back surface 321 of the second support plate 320.

In an embodiment, the adhesive film 430 may be a double-sided adhesive in which both opposing sides have adhesion. In this case, one side of the adhesive film 430 may adhere to the back surface 311 of the first support plate 310 or the back surface 321 of the second support plate 320, and the other side of the adhesive film 430 may adhere to the first protective film 410.

The second protective film 420 may fill a space between a side portion of the back surface 150 of the folding portion 130 of the flexible display module 100 exposed between the first support plate 310 and the second support plate 320 near the lower portion of the case 200 and a side portion of the first protective film 410 near the lower portion of the case 200, and a space between a side portion of the back surface 150 of the folding portion 130 of the flexible display module 100 exposed between the first support plate 310 and the second support plate 320 near the upper portion of the case 200 and a side portion of the first protective film 410 near the upper portion of the case 200.

In an embodiment, the second protective film 420 may be a double-sided adhesive in which both opposing sides have adhesion. In this case, one side of the second protective film 420 may adhere to a side portion, near the upper or lower portions of the case 200, of the back surface 150 of the folding portion 130 of the flexible display module 100 exposed between the first support plate 310 and the second support plate 320, and the other side of the second protective film 420 may adhere to a side portion of the first protective film 410 near the upper or lower portions of the case 200.

The second protective film 420 may be flexible. In an embodiment, the second protective film 420 may include a foam type polymer material, such as a sponge material. Since the second protective film 420 is flexible, a shape of the second protective film 420 may change according to the deformation of the folding portion 130 of the flexible display module 100 and the deformation of the first protective film 410 in which the second protective film 420 is coupled to the folding portion 130 and the first protective film 410.

In an embodiment, the second protective film 420 may be disposed between the side portion of the first support plate 310 near the lower portion of the case 200 and the side portion of the second support plate 320 near the lower portion of the case 200, and between the side portion of the first support plate 310 near the upper portion of the case 200 and the side portion of the second support plate 320 near the upper portion of the case 200. For example, the second protective film 420 may be disposed between the side portion of the first support plate 310 near the lower portion of the case 200 and the side portion of the second support plate 320 near the lower portion of the case 200, and between the side portion of the first support plate 310 near the upper portion of the case 200 and the side portion of the second support plate 320 near the upper portion of the case 200, in which the spaces therebetween have a relatively large interval D2. The second protective film 420 may not be disposed between the central portion of the first support plate 310 near the central portion of the case 200, and the central portion of the second support plate 320 near the central portion of the case 200, in which the space therebetween has a relatively small interval D1.

The back surface 150 of the folding portion 130 of the flexible display module 100 exposed between the first support plate 310 and the second support plate 320 may be blocked from the outside by the first protective film 410 and the second protective film 420. When the first protective film 410 covers the back surface 150 of the folding portion 130 of the flexible display module 100 exposed between the first support plate 310 and the second support plate 320, and when the second protective film 420 fills the space between the side portion of the back surface 150 of the folding portion 130 near the lower portion of the case 200 and the side portion of the first protective film 410 near the lower portion of the case 200, and the space between the side portion of the back surface 150 of the folding portion 130 near the upper portion of the case 200 and the side portion of the first protective film 410 near the upper portion of the case 200, the back surface 150 of the folding portion 130 of the flexible display module 100 exposed between the first support plate 310 and the second support plate 320 may be blocked from the outside by the first protective film 410 and the second protective film 420. Accordingly, the first protective film 410 and the second protective film 420 may block foreign substances from entering the flexible display module 100 through a gap of the case 200 from the outside, and thus, the reliability of the foldable display device may be improved.

Figure 6:
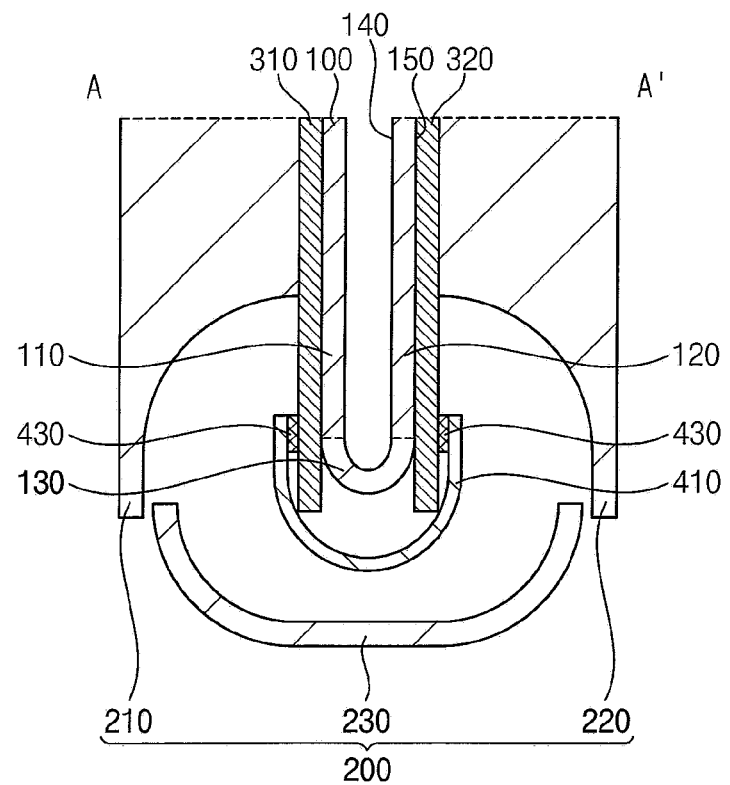
FIG. 6 is a sectional view illustrating a folded state of the foldable display device of FIG. 3 according to some exemplary embodiments.
Figure 7:
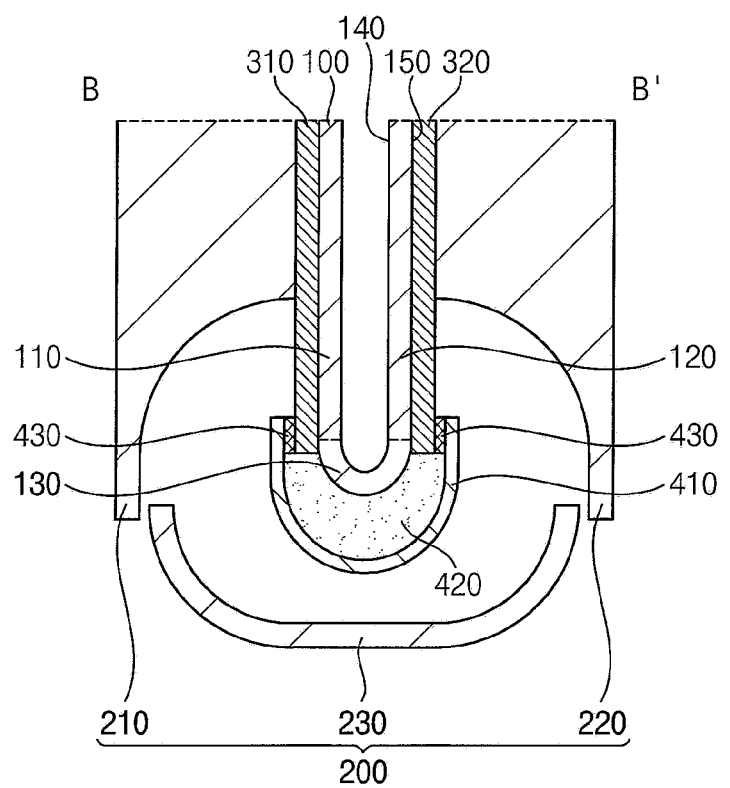
FIG. 7 is a sectional view illustrating a folded state of the foldable display device of FIG. 4 according to some exemplary embodiments.

FIG. 6 is a sectional view illustrating a folded state of the foldable display device of FIG. 3 according to some exemplary embodiments. FIG. 7 is a sectional view illustrating a folded state of the foldable display device of FIG. 4 according to some exemplary embodiments.

Referring to FIGS. 3, 4, 6, and 7, when the foldable display device is unfolded, the flexible display module 100 may be unfolded such that portions of the display surface 140 are horizontally arranged on the same plane. For example, when an external force is applied to the folded foldable display in an outward direction, the first cover 210 and the second cover 220 may be rotated in a counterclockwise direction and in a clockwise direction about the hinge portion 230, respectively, so that the flexible display module 100 may be unfolded.

When the flexible display module 100 is unfolded, the display surface 140 of the first side portion and the display surface 140 of the second side portion of the flexible display module 100 may be parallel to each other. In other words, the display surface 140 of the first non-folding portion 110 and the display surface 140 of the second non-folding portion 120 of the flexible display module 100 may be parallel to each other.

When the foldable display device is folded, the flexible display module 100 may be folded such that the portions of the display surface 140 face each other. For example, when an external force is applied to the unfolded foldable display device in an inward direction, the first cover 210 and the second cover 220 may be rotated in a clockwise direction and in a counterclockwise direction about the hinge portion 230, respectively, so that the flexible display module 100 may be folded.

When the flexible display module 100 is folded, the display surface 140 of the first side portion and the display surface 140 of the second side portion of the flexible display module 100 may face each other. In other words, the display surface 140 of the first non-folding portion 110 and the display surface 140 of the second non-folding portion 120 of the flexible display module 100 may face each other.

The first protective film 410 may be folded when the flexible display module 100 is unfolded, and the first protective film 410 may be unfolded when the flexible display module 100 is folded. Since the interval between the first support plate 310 and the second support plate 320 is reduced when the flexible display module 100 is unfolded, the flexible first protective film 410 coupled to the first support plate 310 and the second support plate 320 may be folded into an undefined shape. Since the interval between the first support plate 310 and the second support plate 320 increases when the flexible display module 100 is folded, the flexible first protective film 410 coupled to the first support plate 310 and the second support plate 320 may be unfolded along the shape of the folding portion 130 of the flexible display module 100.

The second protective film 420 may shrink when the flexible display module 100 is unfolded, and the second protective film 420 may expand when the flexible display module 100 is folded. Since the first protective film 410 is folded when the interval between the first support plate 310 and the second support plate 320 decreases when the flexible display module 100 is unfolded, the flexible second protective film 420 configured to fill the space between the back surface 150 of the flexible display module 100 and the first protective film 410 may shrink in an undefined shape. Since the first protective film 410 is unfolded when the interval between the first support plate 310 and the second support plate 320 increases when the flexible display module 100 is folded, the flexible second protective film 420 configured to fill the space between the back surface 150 of the flexible display module 100 and the first protective film 410 may expand along the shape of the folding portion 130 of the flexible display module 100 and the shape of the first protective film 410.

Figure 8:
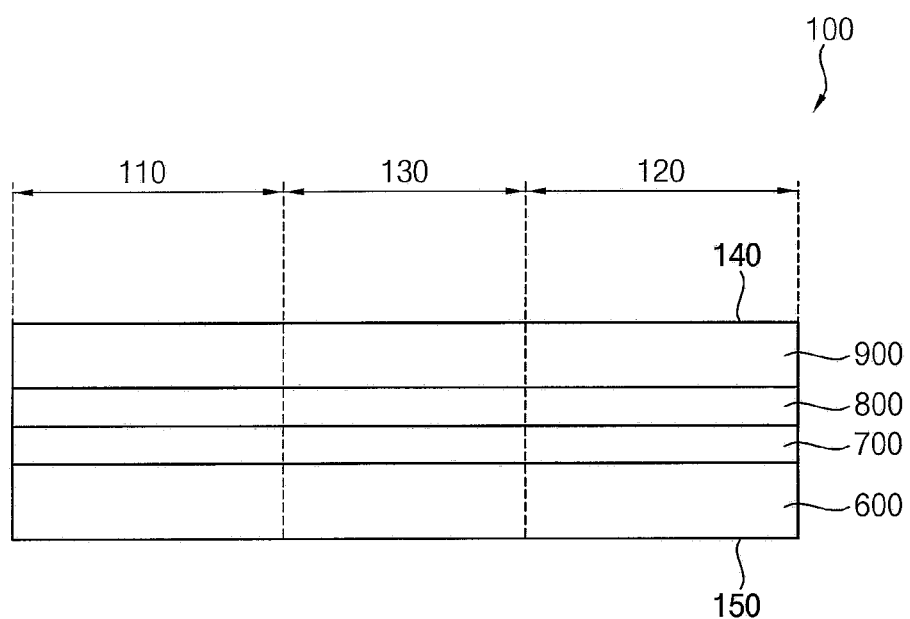
FIG. 8 is a sectional view illustrating a flexible display module according to some exemplary embodiments.

FIG. 8 is a sectional view illustrating the flexible display module 100 according to some exemplary embodiments.

Referring to FIG. 8, the flexible display module 100 may include a display panel 600, a sensing layer 700, a polarization layer 800, and a window 900. As described above, since the flexible display module 100 may be folded or unfolded, each of the display panel 600, the sensing layer 700, the polarization layer 800, and the window 900 may have flexible characteristics.

The display panel 600 may include a plurality of pixels, and may generate an image formed by combining light emitted from the pixels. The display panel 600 may include a first surface and a second surface that are opposite to each other. The display panel 600 may display the image toward the first surface, and the second surface of the display panel 600 may correspond to the back surface 150 of the flexible display module 100.

The sensing layer 700 may be disposed on the display panel 600. The sensing layer 700 may sense an external input, such as an external object, that comes into contact with or approaches the foldable display device. For example, the sensing layer 700 may sense the external input using a capacitive scheme.

The polarization layer 800 may be disposed on the sensing layer 700. The polarization layer 800 may reduce reflection of external light of the foldable display device. For example, when external light passes through the polarization layer 800, is reflected from a lower portion of the polarization layer 800 (for example, a surface interfacing with the sensing layer 700 or a surface of the display panel 600), and passes through the polarization layer 800 again, the external light passes through the polarization layer 800 twice, and thus, a phase of the external light may be changed. Accordingly, the phase of the reflected light is different from the phase of the incident light entering the polarization layer 800 such that destructive interference may occur, and the reflection of the external light decreases so that the visibility of the foldable display device may be improved.

The window 900 may be disposed on the polarization layer 800. The window 900 may protect the display panel 600, the sensing layer 700, and the polarization layer 800 from external shock, and may provide the display surface 140 of the flexible display module 100. In an embodiment, the window 900 may include at least one of polymer resin, such as at least one of polycarbonate (PC), poly(methyl methacrylate) (PMMA), polyarylate (PAR), polyethersulfone (PES), polyethylene terephthalate (PET), and polyethylene naphthalate (PEN), glass, and the like.

Figure 9:
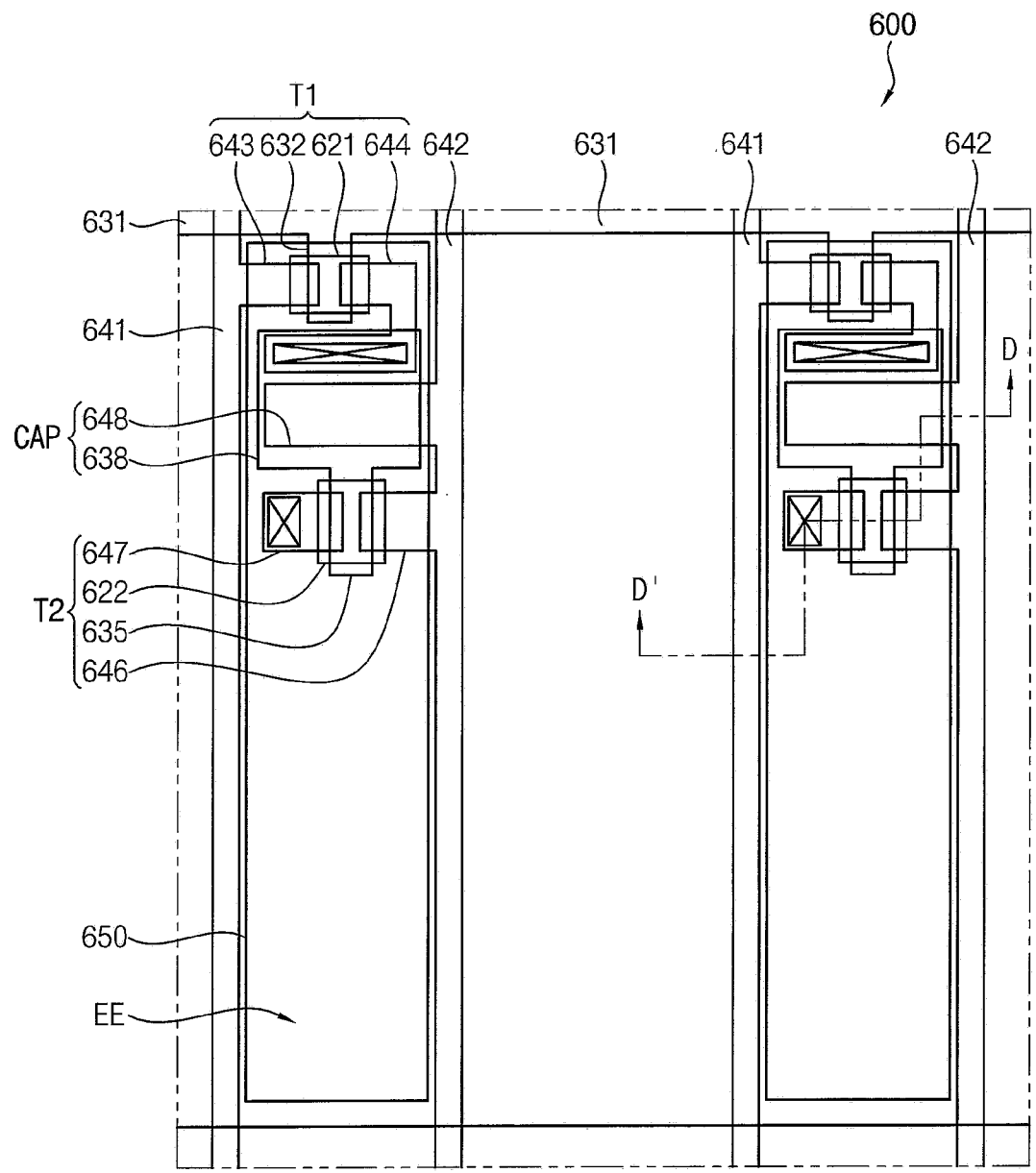
FIG. 9 is a plan view illustrating a display panel according to some exemplary embodiments.
Figure 10:
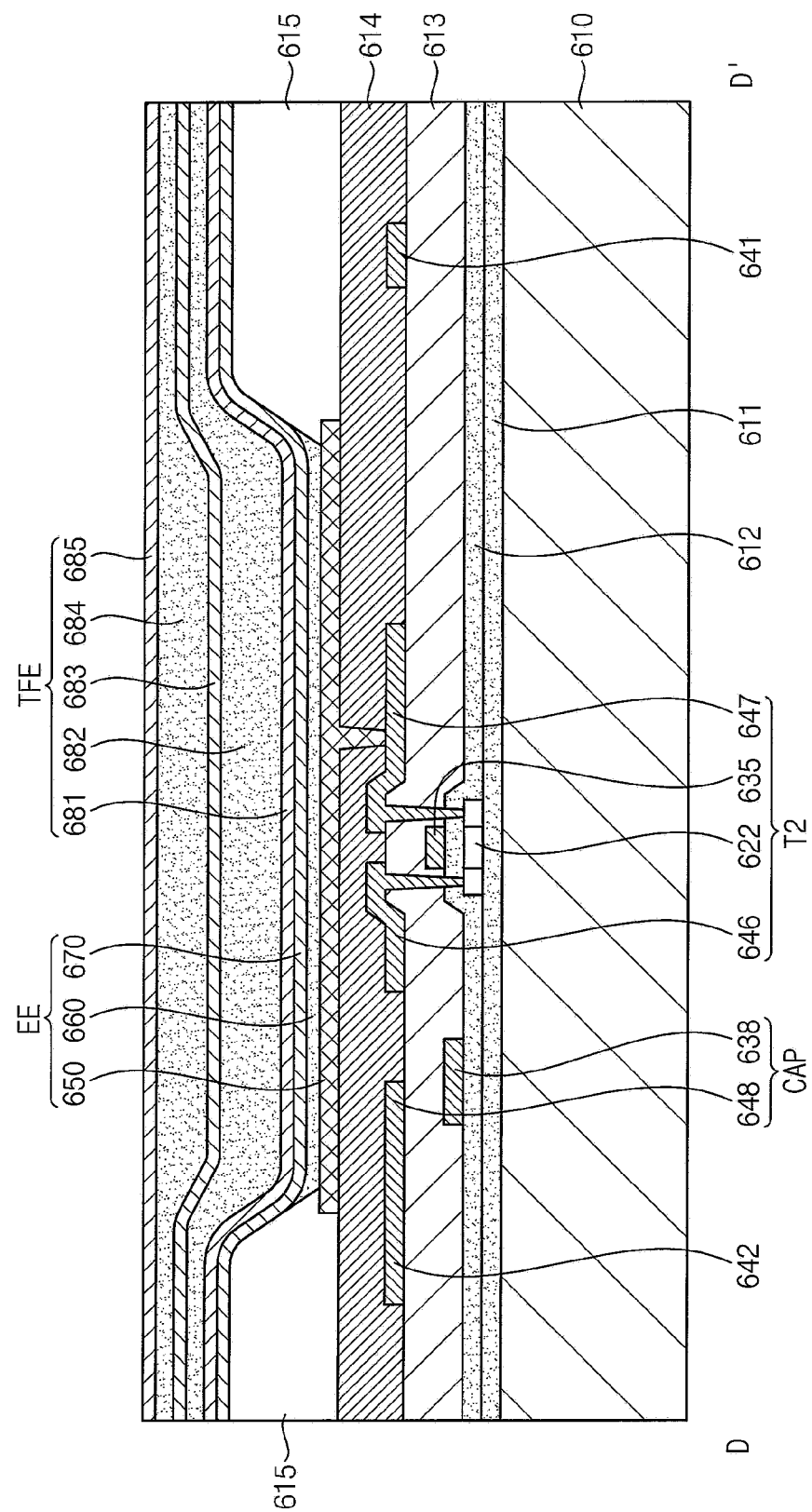
FIG. 10 is a sectional view taken along sectional line D-D' of FIG. 9 according to some exemplary embodiments.

FIG. 9 is a plan view illustrating the display panel of FIG. 8 according to some exemplary embodiments. FIG. 10 is a sectional view taken along sectional line D-D' of FIG. 9 according to some exemplary embodiments.

Referring to FIGS. 9 and 10, the display panel 600 may include a plurality of pixels that each include a switching thin film transistor T1, a driving thin film transistor T2, a capacitor CAP, and a light emitting device EE. The pixel denotes a minimum unit for displaying an image, and the display panel 600 may display the image through the pixels.

Although FIGS. 9 and 10 show that two thin film transistors and one capacitor are disposed in one pixel, embodiments are not limited thereto. For instance, a pixel may be provided with at least three thin film transistors and/or at least two capacitors.

The display panel 600 may include a substrate 610, a gate line 631 disposed on the substrate 610, a data line 641 insulated from and intersected with the gate line 631, and a common power line 642. In general, one pixel may be defined by a boundary between the gate line 631, the data line 641, and the common power line 642, but the boundary of the pixel is not limited to the aforementioned definition. For instance, the pixel may be alternatively (or additionally) defined by a black matrix or a pixel defining layer.

The substrate 610 may include a flexible material, such as plastic. For example, the substrate 610 may be formed of at least one of polyethersulfone (PES), polycarbonate (PC), polyimide (PI), polyethylene terephthalate (PET), polyethylene naphthalate (PEN), polyacrylate (PAR), and fiber reinforced plastic (FRP), or the like.

The substrate 610 may have a thickness of about 5 μm to about 200 μm. When the substrate 610 has a thickness less than about 5 μm, it may be difficult for the substrate 610 to stably support the light emitting device EE. In addition, when the substrate 610 has a thickness greater than about 200 μm, the flexible characteristics of the substrate 610 may be deteriorated.

A buffer layer 611 may be disposed on the substrate 610. The buffer layer 611 may serve to prevent the penetration of impurities and planarize a surface of, for instance, substrate 610. The buffer layer 611 may be formed of at least one of silicon nitride, silicon oxide, silicon oxynitride, and the like. However, the buffer layer 611 is not necessarily required, and may be omitted according to a type of the substrate 610 and processing conditions.

A switching semiconductor layer 621 and a driving semiconductor layer 622 may be disposed on the buffer layer 611. The switching semiconductor layer 621 and the driving semiconductor layer 622 may be formed of one of oxide semiconductors, such as polycrystalline silicon, amorphous silicon, indium gallium zinc oxide (IGZO), and indium zinc tin oxide (IZTO). For example, when the driving semiconductor layer 622 is formed of polycrystalline silicon, the driving semiconductor layer 622 may include a channel region that is not doped with impurities, and a source region and a drain region that are formed by doping impurities on both sides of the channel region. In this case, the doped impurities are P-type impurities, such as boron (B), and $B_2H_6$ may be mainly used. The impurities may vary depending on the type of thin film transistor. Although the thin film transistor having a p-type metal-oxide semiconductor (PMOS) structure using the P-type impurities is described as the driving thin film transistor T2 in this embodiment, the driving thin film transistor T2 is not limited thereto. For instance, and a thin film transistor having an n-type metal-oxide semiconductor (NMOS) structure or a complementary metal-oxide semiconductor (CMOS) structure may be used as the driving thin film transistor T2.

A gate insulating layer 612 may be disposed on the switching semiconductor layer 621 and the driving semiconductor layer 622. The gate insulating layer 612 may be formed of at least one of tetraethoxysilane (TEOS), silicon nitride, silicon oxide, and the like. In an embodiment, the gate insulating layer 612 may have a double-film structure in which a silicon nitride film having a thickness of about 40 nm and a tetraethoxysilane film having a thickness of about 80 nm are sequentially laminated.

A gate wiring including gate electrodes 632 and 635 may be disposed on the gate insulating layer 612. The gate wiring may further include a gate line 631, a first power storage plate 638, and the like. The gate electrodes 632 and 635 may be disposed to overlap at least a part (such as the channel region) of the semiconductor layers 621 and 622, respectively. When the impurities are doped in the source region and the drain region of the semiconductor layers 621 and 622 in the process of forming the semiconductor layers 621 and 622, the gate electrodes 632 and 635 may serve to block the impurities from being doped in the channel region.

The gate electrodes 632 and 635 and the first power storage plate 638 may be disposed on the same layer, and may be formed of substantially the same metal. For example, the gate electrodes 632 and 635 and the first power storage plate 638 may be formed of at least one of molybdenum (Mo), chromium (Cr), tungsten (W), and the like.

An interlayer insulating layer 613 covering the gate electrodes 632 and 635 may be disposed on the gate insulating layer 612. Like the gate insulating layer 612, the interlayer insulating layer 613 may be formed of at least one of tetraethoxysilane, silicon nitride, silicon oxide, and the like, but the material of the interlayer insulating layer 613 is not limited thereto.

Data wirings including source electrodes 643 and 646 and drain electrodes 644 and 647 may be disposed on the interlayer insulating layer 613. The data wiring may further include a data line 641, a common power line 642, a second power storage plate 648, and the like. The source electrodes 643 and 646 and the drain electrodes 644 and 647 may be connected to the source region and the drain region of the semiconductor layers 621 and 622 through contact holes formed in the gate insulating layer 612 and the interlayer insulating layer 613, respectively.

The switching thin film transistor T1 may include a switching semiconductor layer 621, a switching gate electrode 632, a switching source electrode 643, and a switching drain electrode 644. The driving thin film transistor T2 may include a driving semiconductor layer 622, a driving gate electrode 635, a driving source electrode 646, and a driving drain electrode 647. In addition, the capacitor CAP may include the first power storage plate 638 and the second power storage plate 648 that are disposed with the interlayer insulating layer 613 therebetween.

The switching thin film transistor T1 may be used as a switching device for selecting a pixel configured to emit light. The switching gate electrode 632 may be connected to the gate line 631. The switching source electrode 643 may be connected to the data line 641. The switching drain electrode 644 may be spaced apart from the switching source electrode 643 and connected to the first power storage plate 638.

The driving thin film transistor T2 may apply a driving power, which allows a light emitting layer 660 of the light emitting device EE in the selected pixel to emit light, to the pixel electrode 650. The driving gate electrode 635 may be connected to the first power storage plate 638. The driving source electrode 646 and the second power storage plate 648 may be connected to the common power line 642. The driving drain electrode 647 may be connected to the pixel electrode 650 of the light emitting device EE through a contact hole.

According to the above structure, the switching thin film transistor T1 may be operated by a gate voltage applied to the gate line 631, thereby serving to transfer the data voltage applied to the data line 641 to the driving thin film transistor T2. A voltage corresponding to a difference between the common voltage applied from the common power line 642 to the driving thin film transistor T2 and the data voltage transferred from the switching thin film transistor T1 may be stored in the capacitor CAP, and a current corresponding to the voltage stored in the capacitor CAP flows into the light emitting device EE through the driving thin film transistor T2, so that the light emitting device EE may emit light.

A planarization layer 614 may be disposed on the interlayer insulating layer 613 to cover the data lines patterned on the same layer as the data line 641, the common power line 642, the source electrodes 643 and 646, the drain electrodes 644 and 647, and the second power storage plate 648.

The planarization layer 614 may serve to remove and planarize steps to increase the luminance efficiency of the light emitting device EE formed thereon. The planarization layer 614 may be formed of at least one of acrylic-based resin (polyacrylate resin), epoxy resin, phenolic resin, polyamide-based resin, polyimide-based resin, unsaturated polyester-based resin, polyphenylene-based resin, polyphenylene sulfide-based resin, benzocyclobutene (BCB), and the like.

The pixel electrode 650 of the light emitting device EE may be disposed on the planarization layer 614. The pixel electrode 650 may be connected to the drain electrode 647 through a contact hole formed in the planarization layer 614.

A pixel defining layer 615 may be disposed on the planarization layer 614 to expose at least a part of the pixel electrode 650 so as to define a pixel region. The pixel electrode 650 may be disposed to correspond to the pixel region of the pixel defining layer 615. The pixel defining layer 615 may be formed of at least one of polyacrylate-based resin, polyimide-based resin, and the like.

The light emitting layer 660 may be disposed on the pixel electrode 650 in the pixel region, and a common electrode 670 may be disposed on the pixel defining layer 615 and the light emitting layer 660. The light emitting layer 660 may be formed of a low molecular organic material or a high molecular organic material. At least one of a hole injection layer (HIL) and a hole transport layer (HTL) may be further disposed between the pixel electrode 650 and the light emitting layer 660, and at least one of an electron transport layer (ETL) and an electron injection layer (EIL) may be further disposed between the light emitting layer 660 and the common electrode 670.

Each of the pixel electrode 650 and the common electrode 670 may be formed as any one of a transmissive electrode, a transflective electrode, and a reflective electrode.

Transparent conductive oxide (TCO) may be used to form the transmissive electrode. The transparent conductive oxide (TCO) may include at least one of indium tin oxide (ITO), indium zinc oxide (IZO), zinc oxide (ZnO), indium oxide ($In_2O_3$), and the like.

In order to form the transflective electrode and the reflective electrode, metal such as magnesium (Mg), silver (Ag), gold (Au), calcium (Ca), lithium (Li), chromium (Cr), aluminum (Al), copper (Cu), or an alloy thereof, may be used. At this time, the determination between the transflective electrode and the reflective electrode may depend on a thickness. In general, the transflective electrode may have a thickness of about 200 nm or less, and the reflective electrode may have a thickness of about 300 nm or more. The transflective electrode may have a higher light transmittance, but have a higher resistance as the thickness decreases, and may have a lower light transmittance as the thickness increases. In addition, the transflective electrode and the reflective electrode may be formed in a multilayer structure including a metal layer formed of metal or a metal alloy and a transparent conductive oxide layer formed on the metal layer.

A thin film encapsulation layer TFE may be disposed on the common electrode 670. The thin film encapsulation layer TFE may include at least one inorganic film 681, 683, and 685, and at least one organic film 682 and 684. In addition, the thin film encapsulation layer TFE may have a structure in which the inorganic films 681, 683, and 685 and organic films 682 and 684 are alternately laminated. In this case, the inorganic film 681 may be disposed at the bottom. In other words, the inorganic film 681 may be disposed most adjacent to the light emitting device EE.

Although FIG. 10 shows that the thin film encapsulation layer TFE includes three inorganic films 681, 683, and 685 and two organic films 682 and 684, embodiments are not limited thereto.

The inorganic films 681, 683, and 685 may be formed of at least one inorganic material, such as at least one of $Al_2O_3$, $TiO_2$, $ZrO$, $SiO_2$, AlON, AlN, SiON, $Si_3N_4$, ZnO, and $Ta_2O_5$. The inorganic films 681, 683, and 685 may be formed through, for instance, chemical vapor deposition (CVD) or atomic layer deposition (ALD). The inorganic films 681, 683, and 685 may mainly block the penetration of moisture and/or oxygen. The inorganic films 681, 683, and 685 may block most of the moisture and oxygen from penetrating into the light emitting device (EE).

The organic films 682 and 684 may be formed of, for example, a polymer-based material. The polymer-based material may include at least one of acrylate-based resin, epoxy-based resin, polyimide, polyethylene, and the like. In addition, the organic films 682 and 684 may be formed through, for instance, a thermal deposition process. The thermal deposition process for forming the organic films 682 and 684 may be performed within a temperature range that does not damage the light emitting device EE.

The thin film encapsulation layer TFE may have a thickness of about 10 µm or less. Accordingly, the overall thickness of the display panel 600 may be formed to be very thin. As such, the thin film encapsulation layer TFE is disposed on the light emitting device EE so that the flexible characteristics of the display panel 600 may be, for example, maximized.

Figure 11:
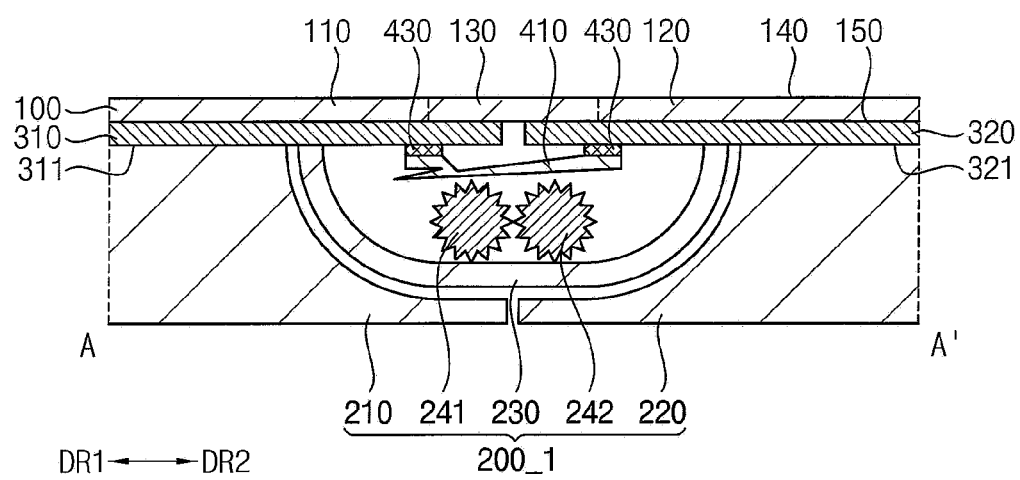
FIG. 11 is a sectional view illustrating another example of the foldable display device taken along sectional line A-A' of FIG. 1 according to some exemplary embodiments.

FIG. 11 is a sectional view illustrating another example of the foldable display device taken along sectional line A-A' of FIG. 1 according to some exemplary embodiments.

Referring to FIG. 11, in one embodiment, the case 200_1 may further include a first gear 241 and a second gear 242. The first gear 241 and the second gear 242 may be positioned inside the hinge portion 230. The first gear 241 may be rotatably coupled to the first cover 210 so that the first cover 210 may also rotate when the first gear 241 rotates. The second gear 242 may be rotatably coupled to the second cover 220 so that the second cover 220 may also rotate when the second gear 242 rotates.

The first gear 241 and the second gear 242 may be engaged with each other. Since the first gear 241 and the second gear 242 are engaged with each other, and when one of the first gear 241 and the second gear 242 rotates, the other one that is engaged therewith, may also rotate. Thus, according to some embodiments, even when only one of the first cover 210 and the second cover 220 rotates, the other may also rotate.

In an embodiment, the first protective film 410 may be folded in a shape that is not predetermined. Since the first protective film 410 is flexible, even when structures, such as the first gear 241 and the second gear 242, are positioned in the hinge portion 230, the first protective film 410 may be positioned in the hinge portion 230 together with the structures, such as without interference with the other structures.

FIGS. 12 to 18 are views illustrating a foldable display device at various stages of manufacture according to some exemplary embodiments.

Figure 12:
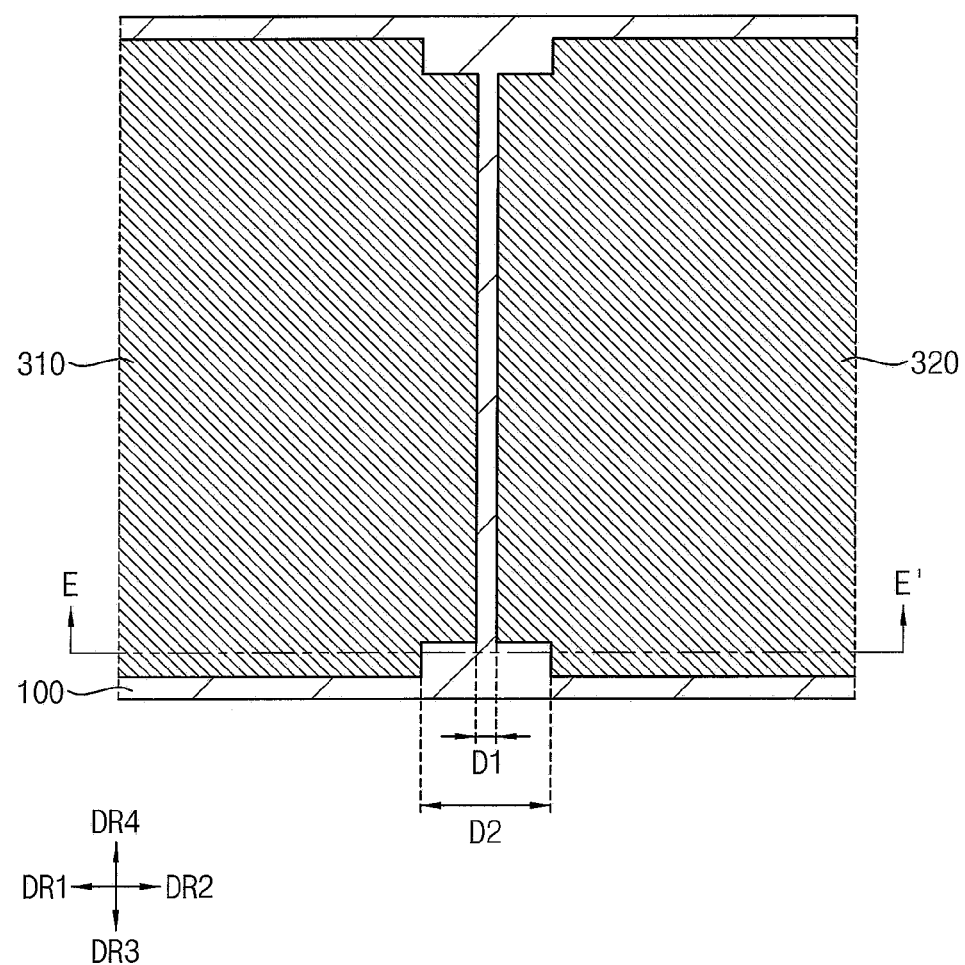
FIGS. 12 to 18 are views illustrating a foldable display device at various stages of manufacture according to some exemplary embodiments.
Figure 13:
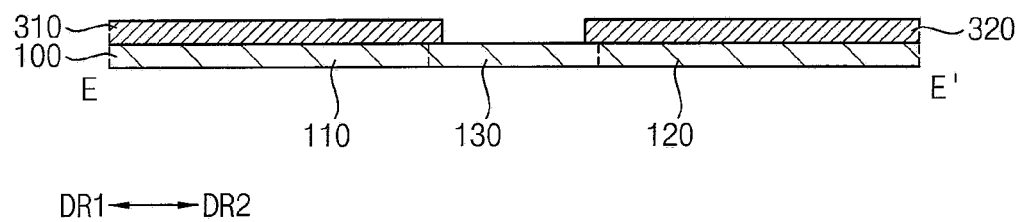

Referring to FIGS. 12 and 13, the first support plate 310 and the second support plate 320 may be attached to the unfolded flexible display module 100. The first support plate 310 and the second support plate 320 may be attached to the first non-folding portion 110 positioned in the first direction DR1 from the folding portion 130 of the flexible display module 100, and the second non-folding portion 120 positioned in the second direction DR2 from the folding portion 130 of the flexible display module 100, respectively.

Figure 14:
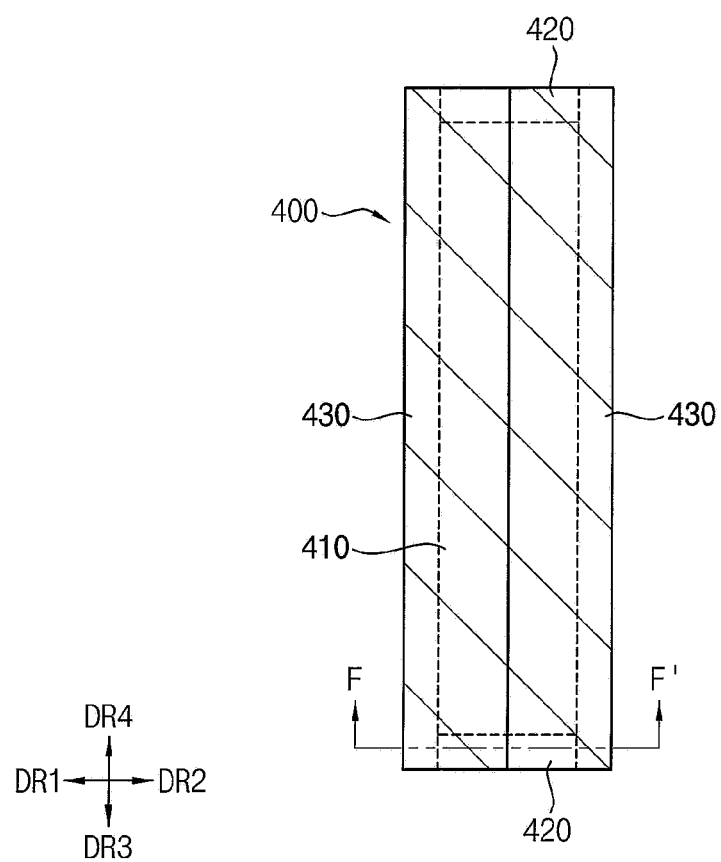
Figure 15:
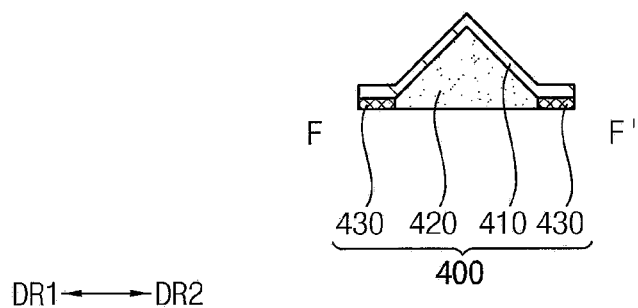

Referring to FIGS. 14 and 15, a protective member 400 including the first protective film 410, the second protective film 420, and the adhesive film 430 may be prepared. The first protective film 410 may be symmetrically folded along the third direction DR3. For example, a central portion of the first protective film 410 in the first direction DR1 or the second direction DR2 may be symmetrically folded along the third direction DR3, and a side portion of the first protective film 410 in the first direction DR1 and a side portion of the first protective film 410 in the second direction DR2 may not be folded.

The second protective film 420 may be interposed between folded side portions of the first protective film 410 in the third direction DR3 and between folded side portions of the first protective film 410 in the fourth direction DR4. For example, the second protective film 420 may be formed on the central portion in the first direction DR1 or the second direction DR2 of the side portion of the first protective film 410 in the third direction DR3 or the fourth direction DR4, and may not be formed on the side portions in the first direction DR1 or the second direction DR2 of the side portion of the first protective film 410 in the third direction DR3 or the fourth direction DR4.

The adhesive film 430 may be formed on unfolded portions of the first protective film 410. For example, the adhesive film 430 may be formed on the side portion of the first protective film 410 in the first direction DR1 and the side portion of the first protective film 410 in the second direction DR2.

Figure 16:
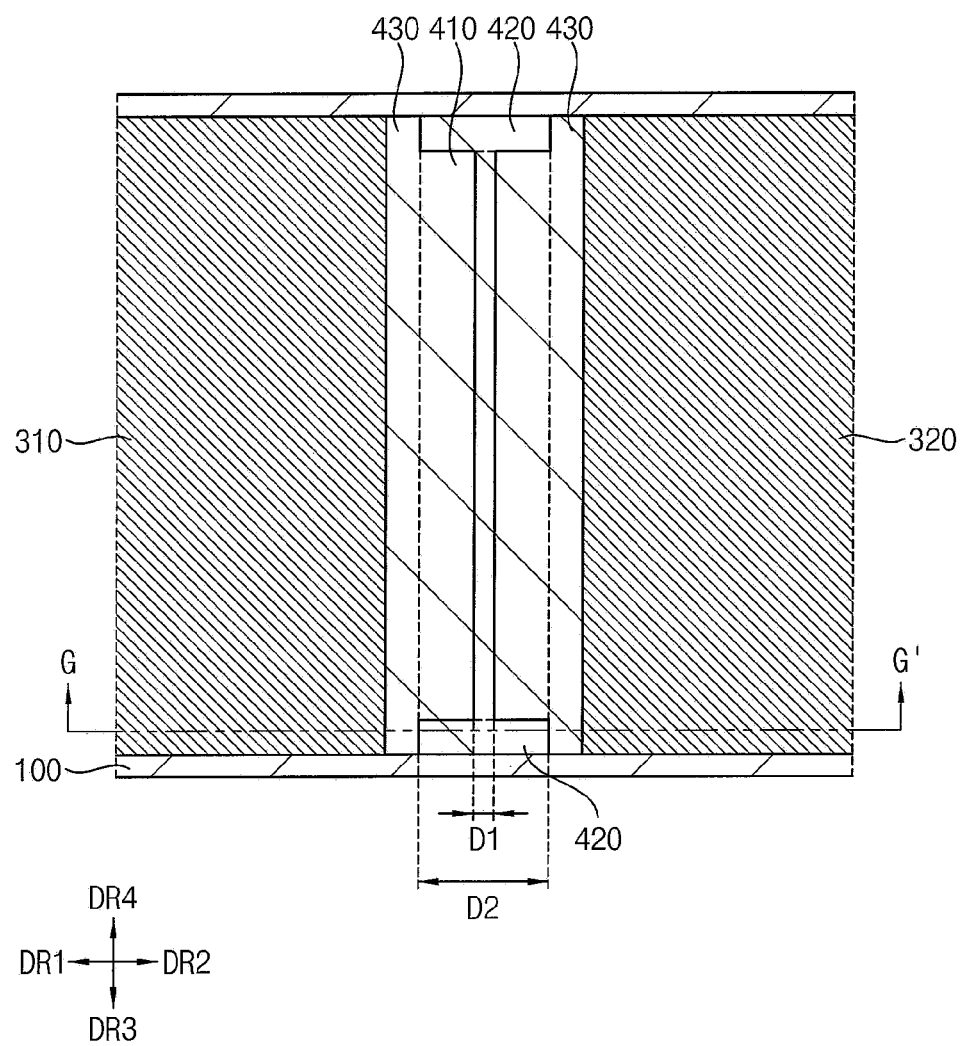
Figure 17:
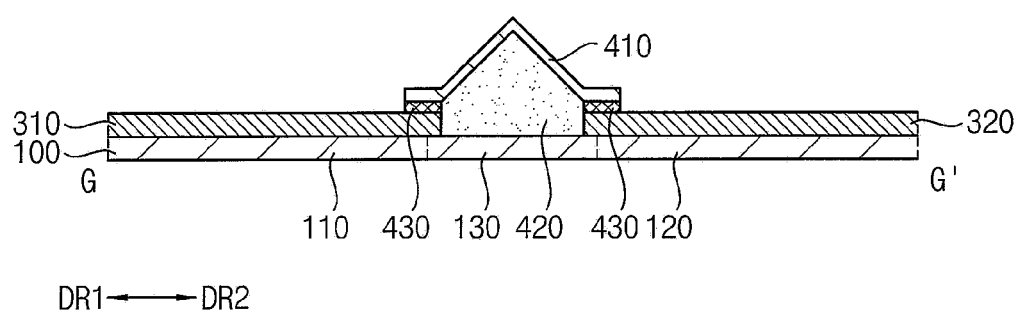

Referring to FIGS. 16 and 17, the protective member 400 may be attached to the flexible display module 100 to which the first support plate 310 and the second support plate 320 are attached.

The first protective film 410 may cover the folding portion 130 of the flexible display module 100 exposed between the first support plate 310 and the second support plate 320. The first protective film 410 may be attached to the first support plate 310 and the second support plate 320 through the adhesive film 430.

The second protective film 420 may be attached to the folding portion 130 of the flexible display module 100 exposed between the first support plate 310 and the second support plate 320. For instance, the second protective film 420 may be attached to the folding portion 130 of the flexible display module 100 between the side portion of the first support plate 310 in the third direction DR3 and the side portion of the second support plate 320 in the third direction DR3, and between the side portion of the first support plate 310 in the fourth direction DR4 and the side portion of the second support plate 320 in the fourth direction DR4.

Figure 18:
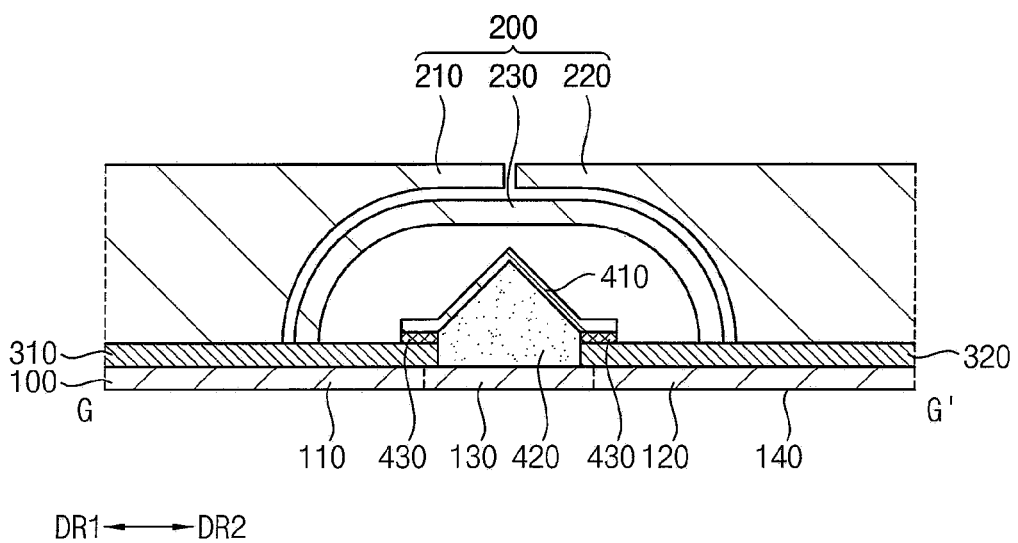

Referring to FIG. 18, the case 200 may be attached to the first support plate 310 and the second support plate 320. The first support plate 310 and the second support plate 320 may be attached to the first cover 210 rotatably coupled via the hinge portion 230 of the case 200 in the first direction DR1, and the second cover 220 rotatably coupled via the hinge portion 230 in the second direction DR2, respectively.

The foldable display device according to various exemplary embodiments may be applied to a display device included in (or associated with) a computer, a notebook, a mobile phone, a smartphone, a smart pad, a personal media player (PMP), a personal digital assistant (PDA), an MP3 player, and/or the like.

Although certain exemplary embodiments and implementations have been described herein, other embodiments and modifications will be apparent from this description. Accordingly, the inventive concepts are not limited to such embodiments, but rather to the broader scope of the accompanying claims and various obvious modifications and equivalent arrangements as would be apparent to one of ordinary skill in the art.

What is claimed is:

1. A foldable display device comprising:
 a flexible display module comprising a display surface and a back surface opposite to the display surface;
 a case disposed on the back surface of the flexible display module, the case comprising:
 a hinge portion;
 a first cover rotatably coupled to the hinge portion in a first direction; and
 a second cover rotatably coupled to the hinge portion in a second direction opposite to the first direction;
 a first support plate disposed between the flexible display module and the first cover, the first support plate supporting a first side portion of the flexible display module;

a second support plate disposed between the flexible display module and the second cover, the second support plate supporting a second side portion of the flexible display module and being spaced apart from the first support plate; and a first protective film coupled between the first support plate and the second support plate, the first protective film covering the back surface of the flexible display module exposed between the first support plate and the second support plate, wherein portions of the first and second support plates are arranged between the first protective film and the flexible display module.

2. The foldable display device of claim 1, wherein the first protective film is flexible.

3. The foldable display device of claim 1, wherein, in an unfolded state of the flexible display module, the first protective film is configured to be in a folded state.

4. The foldable display device of claim 1, further comprising:

a first adhesive film disposed between a back surface of the first support plate and the first protective film; and a second adhesive film disposed between a back surface of the second support plate and the first protective film.

5. The foldable display device of claim 1, wherein, in a folded state of the flexible display module, the display surface of the first side portion and the display surface of the second side portion of the flexible display module face each other.

6. The foldable display device of claim 1, further comprising:

a second protective film filling a space between the back surface of the flexible display module, which is exposed between the first support plate and the second support plate, and a surface of the first protective film facing the back surface of the flexible display module, which is exposed between first support plate and the second support plate.

7. The foldable display device of claim 6, wherein the second protective film is stretchable.

8. The foldable display device of claim 6, wherein:

in an unfolded state of the flexible display module, the second protective film is configured to be in a shrunk state; and in a folded state of the flexible display module, the second protective film is configured to be in an expanded state.

9. The foldable display device of claim 6, wherein the back surface of the flexible display module, which is exposed between the first support plate and the second support plate, is blocked from an outside by the first protective film and the second protective film.

10. The foldable display device of claim 6, wherein an interval between a side portion of the first support plate near a first edge of the case and a side portion of the second support plate near the first edge of the case is greater than an interval between a central portion of the first support plate and a central portion of the second support plate in the third direction.

11. The foldable display device of claim 10, wherein the second protective film is disposed between the side portion of the first support plate near the first edge of the case and the side portion of the second support plate near the edge of the case.

12. A foldable display device comprising:

a flexible display module comprising:

a folding portion;

a first non-folding portion positioned in a first direction from the folding portion; and a second non-folding portion positioned in a second direction from the folding portion, the second direction being opposite to the first direction;

a case disposed on the flexible display module, the case comprising:

a hinge portion;

a first cover rotatably coupled to the hinge portion in the first direction; and a second cover rotatably coupled to the hinge portion in the second direction;

a first support plate disposed between the flexible display module and the first cover, the first supporting plate supporting the first non-folding portion of the flexible display module;

a second support plate disposed between the flexible display module and the second cover, the second support plate supporting the second non-folding portion of the flexible display module and being spaced apart from the first support plate; and a first protective film coupled between the first support plate and the second support plate, the first protective film covering the folding portion of the flexible display module exposed between the first support plate and the second support plate, wherein:

the first protective film is positioned inside the hinge portion; and portions of the first and second support plates are arranged between the first protective film and the flexible display module.

13. The foldable display device of claim 12, further comprising:

an adhesive film disposed between the first support plate and the first protective film and between the second support plate and the first protective film.

14. The foldable display device of claim 12, wherein a display surface of the first non-folding portion of the flexible display module and a display surface of the second non-folding portion of the flexible display module face each other in a folded state of the flexible display module.

15. The foldable display device of claim 12, further comprising:

a second protective film filling a space between a portion of the flexible display module that is exposed between the first support plate and the second support plate and a surface of the first protective film facing the portion of the flexible display module that is exposed between the first support plate and the second support plate.

16. The foldable display device of claim 15, wherein the folding portion of the flexible display module exposed between the first support plate and the second support plate is blocked from an outside by the first protective film and the second protective film.

17. The foldable display device of claim 12, wherein the case further comprises:

a first gear positioned inside the hinge portion and rotatably coupled to the first cover; and a second gear positioned inside the hinge portion, rotatably coupled to the second cover, and engaged with the first gear.

18. A method of manufacturing a foldable display device, the method comprising:
- attaching a first support plate to a first non-folding portion of a flexible display module, the first non-folding portion being positioned in a first direction from a folding portion of the flexible display module;
- attaching a second support plate to a second non-folding portion of the flexible display module, the second non-folding portion being positioned in a second direction from the folding portion of the flexible display module, the second direction being opposite to the first direction;
- attaching a protective member to the first support plate and the second support plate such that a first protective film of the protective member covers the folding portion of the flexible display module exposed between the first support plate and the second support plate, the first protective film being symmetrically folded along a third direction orthogonal to the first direction; and
- attaching a case to the first support plate and the second support plate, the case comprising a hinge portion, a first cover rotatably coupled to the hinge portion in the first direction, and a second cover rotatably coupled to the hinge portion in the second direction,
- wherein portions of the first and second support plates are arranged between the first protective film and the flexible display module.

19. The method of claim 18, wherein:
- the protective member further comprises a second protective film interposed between folded side portions of the first protective film in the third direction; and
- the second protective film is attached to the folding portion of the flexible display module exposed between the first support plate and the second support plate.

20. The method of claim 19, wherein:
- an interval between a side portion of the first support plate near an edge of the case and a side portion of the second support plate near the edge of the case is greater than an interval between a central portion of the first support plate and a central portion of the second support plate; and
- the second protective film is attached to the folding portion of the flexible display module between the side portion of the first support plate near the edge of the case and the side portion of the second support plate near the edge of the case.

21. The method of claim 18, wherein:
- the protective member further comprises an adhesive film formed on unfolded portions of the first protective film; and
- the first protective film is attached to the first support plate and the second support plate through the adhesive film.

* * * * *